United States Patent Office 3,528,840
Patented Sept. 15, 1970

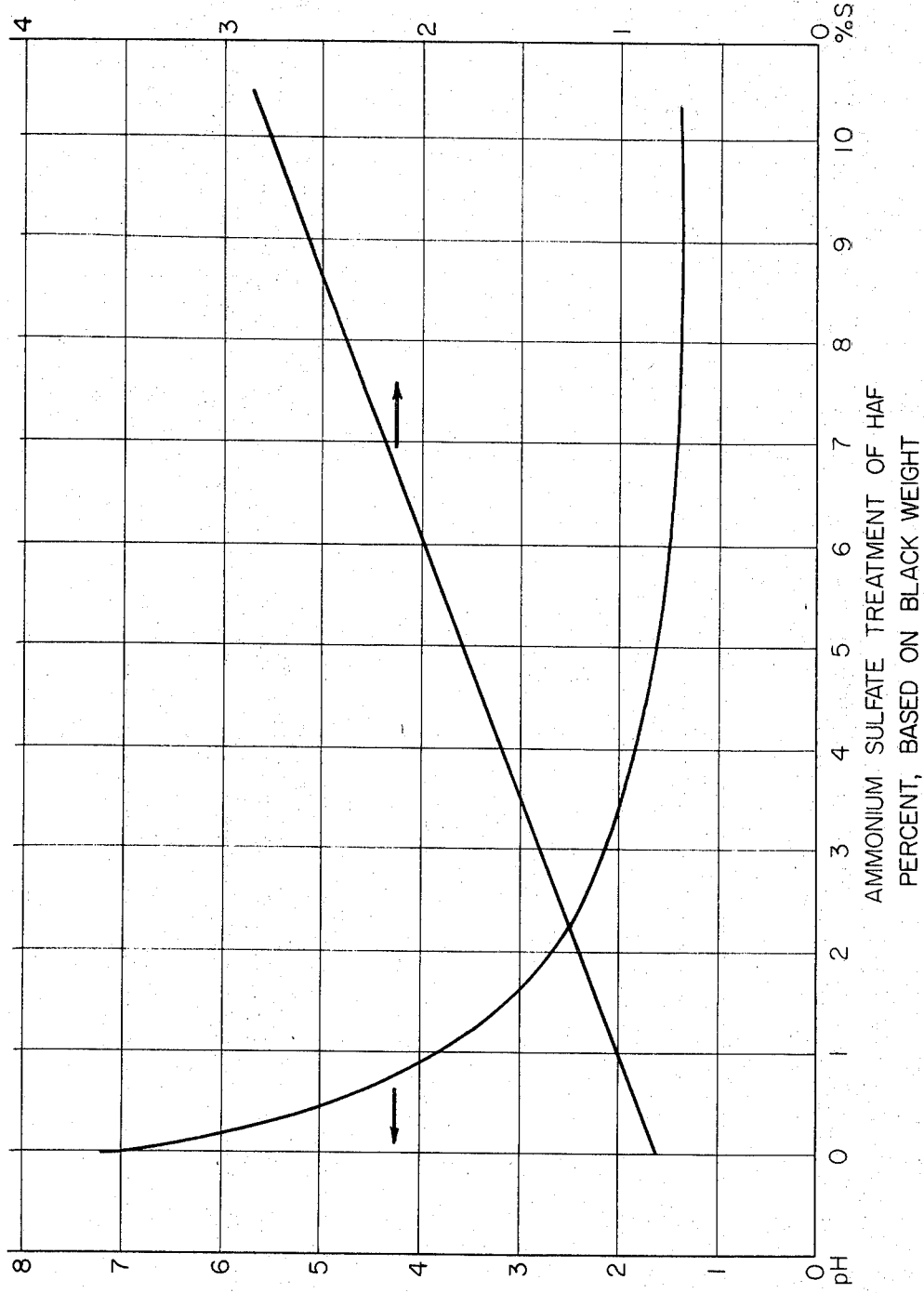

---

3,528,840
SULFONATED CARBON BLACK
Peter Aboytes, Borger, Tex., assignor to J. M. Huber Corporation, Locust, N.J., a corporation of New Jersey
Filed Nov. 15, 1967, Ser. No. 683,312
Int. Cl. C09c 1/56
U.S. Cl. 106—307     2 Claims

ABSTRACT OF THE DISCLOSURE

A carbon black having the sulfur containing residual group of thermally decomposed ammonium sulfate or ammonium sulfite bonded thereto producing a sulfonated carbon black and a method of producing sulfonated carbon black by spraying an ammonium sulfate or ammonium sulfite aqueous solution onto wet pellets of carbon black or onto loose black in a pin mixer pelletizer followed by drying at a temperature sufficient to decompose the ammonium compound and drive off the ammonia gas.

BACKGROUND OF THE INVENTION

Field of the invention

The present invention relates to the chemical modification of carbon black to improve desirable characteristics of the black and/or to produce desired characteristics not previously present in the carbon black, without degrading other properties of the black.

Description of the prior art

The reaction of carbon black with various modifiers to produce desired results has long been known. However, most of such reactions are quite expensive to produce and the final carbon black product is much too costly for the most common uses. Mixtures of carbon black and modifiers have been used to produce some desired characteristics, but in each case a deterioration in one or more other desired property has resulted.

The use of carbon black modifiers to improve rubber cure rates has almost always degraded at least one desirable property of the rubber and many times has degraded several properties of the rubber.

SUMMARY OF THE INVENTION

In the practice of the invention carbon black produced by thermal decomposition of a hydrocarbon feedstock in a conventional furnace process is pelleted in a pin mixer pelletizer of conventional design and the wet pellets are sprayed with an aqueous solution of ammonium sulfate or ammonium sulfite. Alternatively the aqueuos solution of ammonium sulfate or ammonium sulfite is sprayed into the pin mixer pelletizer to provide the water of pelletization. The pellets wetted with the solution are then dried at a temperature high enough to dry the pelets and simultaneously to thermally decompose the ammonium compound releasing ammonia gas while bonding the sulfur containing residual group to the carbon black.

Carbon black produced by this invention is useful in rubber compounds since it increases the scorch time without deleteriously affecting the properties of the finished rubber.

Carbon black modified according to the invention is also useful in compositions requiring a water base since the sulfonic groups on the surface of the black convert the carbon black to a hydrophilic substance.

BRIEF DESCRIPTION OF THE DRAWING

The drawing is a graph of the relationship of the ammonium sulfate treatment to the increase in sulfur content of the carbon black and the decrease in pH of the carbon black.

DESCRIPTION OF THE PREFERRED EMBODIMENTS

Example I

As a control for the following examples normally produced HAF carbon black pelletized in a conventional manner was tested and found to have a sulfur content of 0.82% and a pH of 7.3.

Example II

The normally produced HAF carbon black of Example I was treated by having 600 grams, based on the dry weight of the black, in the form of wet pellets having 50.2% moisture sprayed with an aqueous solution of ammonium sulfate consisting of 3 grams of ammonium sulfate in 125 milliliters of water while being agitated in a rotary stainless steel drum. The pellets were then heated to 450° F. for 15 minutes while continuing the rotation of the drum. The finished carbon black had a sulfur content of 0.86% and a pH of 5.0.

Example III

Example II was repeated increasing the ammonium sulfate to 6 grams. The finished carbon black had a sulfur content of 0.90% and a pH of 3.3.

Example IV

Example II was repeated increasing the ammonium sulfate to 24 grams. The finished carbon black had a sulfur content of 1.60 and a pH of 1.9.

Example V

Example II was repeated increasing the ammonium sulfate to 60 grams. The finished carbon black had a sulfur content of 2.75% and a pH of 1.4.

The above examples were repeated using normally produced ISAF black with similar results. The examples were also repeated using ammonium sulfite, also with similar results.

The decomposition of the ammonium sulfate and ammonium sulfite in the above examples was complete in the time and temperature given since ammonia was no longer evolved from the black.

The following tables illustrate properties of the treated black.

TABLE I—RUBBER PROPERTIES OF CARBON BLACK TREATED WITH 4% AMMONIUM SULFITE LTP RECIPE, 60' CURE AT 300° F.

|  | ISAF Black | | HAF Black | |
|---|---|---|---|---|
|  | Control | W/ammonium sulfite | Control | W/ammonium sulfite |
| pH | 6.8 | 1.9 | 7.3 | 1.9 |
| Tensile strength at break (p.s.i.) | 3,640 | 3,480 | 3,500 | 3,520 |
| 300% modulus (p.s.i.) | 1,640 | 1,570 | 2,120 | 2,000 |
| Elongation (percent) | 550 | 550 | 460 | 460 |
| Hardness (Shore A) | 69 | 70 | 64 | 68 |
| Huber-Goodyear abrasion index | 100.0 | 87.3 | 100.0 | 87.3 |
| Mooney Scorch MS 3 pt. rise at 275° F. | 30 | 32 | 28 | 33 |
| Mooney viscosity ML 4' at 212° F. | 69 | 69 | 63 | 63 |
| Extrusion, percent die swell | 100.0 | 97.9 | 100.0 | 102.5 |
| Flexometer, Firestone (° F.) |  |  | 263 | 270 |

TABLE II—PHYSICO-CHEMICAL PROPERTIES OF CARBON BLACKS TREATED WITH AMMONIUM SULFITE AND AMMONIUM SULFATE

| | $I_2$ Ads. mgm./gm. | DBP Abs. cc./100 gm. | Ash, percent | pH | Spec. Vol., cc./100 gm. | Sulfur, percent | Oxygen percent |
|---|---|---|---|---|---|---|---|
| HAF, control | 70.3 | 108 | 0.64 | 6.6 | 131.2 | .78 | 1.25 |
| HAF W/4%($NH_4$)$_2$ $SO_3 \cdot H_2O$ | 65.2 | 95 | 0.65 | 1.6 | 127.4 | 1.63 | 2.53 |
| ISAF, control | 118.1 | 111 | | 6.8 | 136.5 | 0.77 | |
| ISAF W/4%($NH_4$)$_2$ $SO_3 \cdot H_2O$ | 107.5 | 107 | | 1.9 | 132.1 | 1.68 | |
| ISAF W/4%($NH_4$)$_2$ $SO_4$ | 106.2 | 105 | | 1.9 | 132.9 | 1.55 | |

It should be noted that the cure rate in Table I was not retarded even though the pH was reduced to 1.9.

Having thus described the preferred embodiments of the invention it should be understood that modifications may be employed without departing from the scope of the claims.

I claim:

1. A method of producing a sulfonated carbon black comprising producing a fluffy carbon black by the thermal decomposition of a hydrocarbon, forming wet pellets with substantially 50% moisture, spraying an aqueous solution of ammonium sulfate or ammonium sulfite on the wet pellets, heating the pellets at substantially 450° F. for about 15 minutes and recovering a carbon black having a pH of from 1.4 to 6.5.

2. A method as claimed in claim 1 wherein the ammonium sulfate or ammonium sulfite constitutes from 0.5% to 10% of the dry weight of the carbon black.

References Cited

UNITED STATES PATENTS

| 2,641,535 | 6/1953 | Cines | 23—209.1 |
| 3,023,118 | 2/1962 | Donnet | 106—307 |
| 3,330,799 | 7/1967 | Voet | 106—307 X |
| 3,442,679 | 5/1969 | Rivin | 106—307 |

FOREIGN PATENTS

| 1,215,895 | 4/1960 | France. |

EDWARD J. MEROS, Primary Examiner

U.S. Cl. X.R.

23—209.1